United States Patent Office 3,481,972
Patented Dec. 2, 1969

3,481,972
SUBSTITUTED HYDROXYETHYL ACID
HYDRAZIDES
Donald L. Trepanier, Indianapolis, Ind., assignor to The
Dow Chemical Company, Midland, Mich., a corporation of Delaware
No Drawing. Continuation-in-part of applications Ser.
No. 547,447, May 4, 1966, and Ser. No. 394,624,
Sept. 4, 1964, now Patent No. 3,290,303, dated Dec.
6, 1966. This application Sept. 28, 1966, Ser. No.
582,549
Int. Cl. C07c 69/00, 103/26, 93/20
U.S. Cl. 260—468          8 Claims

ABSTRACT OF THE DISCLOSURE

Substituted 2-(β-hydroxyethyl)-2-methyl hydrazides of acids such as benzoic or substituted benzoic acid are prepared by the reaction of an N-amino-β-methyl-aminoethanol with an acyl chloride. The compounds are useful as chemical intermediates, as antidepressants and as pesticides.

This is a continuation-in-part of application Ser. No. 547,447, filed May 4, 1966, now abandoned and application Ser. No. 394,624, filed Sept. 4, 1964, now Patent No. 3,290,303.

This invention is concerned with novel compounds and is particularly directed to substituted hydroxyethyl acid hydrazides corresponding to the formulae:

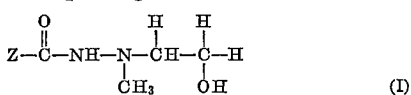
(I)

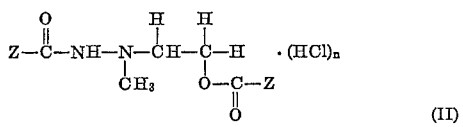
(II)

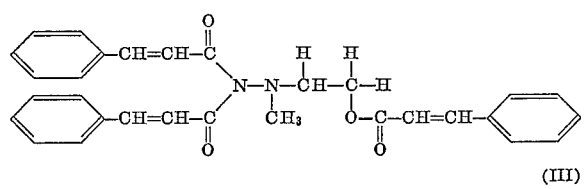
(III)

In these and subsequent formulae set forth in the present specification and claims, Z represents furyl, cyclohexyl, phenyl, benzyl, styryl, dihydrostyryl or substituted phenyl and $n$ represents one of the integers 0 and 1. When Z is substituted phenyl, suitable substituents include one, or two, or three substituents selected from halogens and lower alkyl, lower alkoxy and hydroxy groups. As employed in the present specification and claims, the terms "lower alkyl" and "lower alkoxy" refer to such groups containing from 1 to 4 carbon atoms, inclusive, and the term "halogens" refers to chlorine and bromine. The compounds of the present invention are crystalline solids which are only slightly soluble in water and of varying degrees of solubility in various common organic solvents.

These novel compounds have been found useful as intermediates in the preparation of 2-methyl-2-(β-chloroethyl) acid hydrazides. 2-methyl-2-(β-chloroethyl) acid hydrazides are disclosed and claimed in my copending application Ser. No. 582,553, filed concurrently herewith, now Patent No. 3,428,678. The novel hyrazides are also pharmacologically useful in combating reserpine-induced depression and in prolonging the stimulation produced by the administration of 3,4-dihydroxyphenyl-L-alanine (DOPA). Thus, the compounds of the present invention act as mononaminoxidase inhibitors and may be employed as antidepressants or psychic energizers. The novel acid hydrazides have also been found useful as pesticides for the control of such representative organisms as insects, arachnids, nematodes, fungi, plants and helminth organisms.

The novel compounds can be named either as substituted acid hydrazides or as substituted hydrazines. For example, p-chlorobenzoic acid 2-(β-hydroxyethyl)-2-methylhydrazide can also be described as 1-methyl-1-(β-hydroxyethyl)-2-(p-chlorobenzoyl)hydrazine, and p-toluic acid 2-[β-p-toluyloxy)ethyl]-2-methylhyrazide can be named as 1-methyl-1-[β-(p-toluyloxy)ethyl]-2-(p-toluyl)hydrazine. In the present specification and claims, the compounds corresponding to Formulae I and II are designated as hydrazides and the compound corresponding to Formula III is designated as a hydrazine. Such designations are a matter of nomenclature and are not to be construed as limiting the invention.

The 2-(β-hydroxyethyl) acid hydrazides corresponding to Formulae II and III are prepared by reacting a suitable N-amino-β-methyl-aminoethanol with an acyl chloride of the formula Z—COCl. The compounds corresponding to Formula I are produced by the same reaction followed by selective hydrolysis. The exothermic reaction proceeds readily with the production of the desired product at temperatures of from 25° to 200° C. and preferably at the boiling temperature of the reaction mixture.

The proportions of the reactants to be employed are somewhat critical and the yield and type of product will vary depending upon such proportions. Since the N-amino-β-methyl-aminoethanols employed as starting materials have both amino and hydroxy functions in the same molecule, it is possible to react two moles of the acyl chloride with each mole of amino alcohol. In the preparation of the compound corresponding to Formula III, the reaction in going to completion consumes three moles of cinnamoylchloride for each mole of N-amino-β-methyl-aminoethanol. However, in most other cases, it is necessary to employ two moles of the acyl chloride per mole of the amino alcohol to produce an ester-hydrazide intermediate. In a convenient procedure, the reactants are employed in at least such proportions and preferably with a slight excess of the substituted acyl chloride. The reaction of the acyl chloride with the amino alcohol proceeds readily with elimination of hydrogen chloride of reaction. This reaction is preferably carried out in a suitable organic solvent containing a hydrogen chloride acceptor such as pyridine or a tertiary alkylamine. The hydrogen chloride acceptor is employed in a molar proportion at least equivalent to the molar proportion of the acyl chloride.

In carrying out the production of the ester-hydrazides, the compounds corresponding to Formulae II and III, the reactants are contacted together in any order or fashion in the presence of a hydrogen chloride acceptor. In a convenient procedure, the reactants are contacted together in the presence of an inert organic reaction medium. Representative inert organic reaction media include xylene methylene chloride, benzene, toluene and diphenyl ether. It is not generally necessary to heat the reaction mixture immediately upon contacting the reactants as the heat from the exothermic reaction will generally raise the temperature of the reaction mixture to a temperature within the desired temperature range. However, in a preferred procedure, additional heat is added to the reaction mixture to maintain the temperature thereof within the desired temperature range. Following the reaction period, the reaction mixture is made just basic to litmus by the addition of an aqueous base such as aqueous sodium carbonate, sodium hydroxide, potassium hydroxide or potassium carbonate. During the addition of the aqueous base, the reaction medium separates into an organic layer and an alkaline aqueous layer. The organic layer is separated from the aqueous layer and the aqueous layer extracted with chloroform. The chloroform employed to extract the aqueous layer can then be combined with the previously-separated organic layer and the resulting mixture dried with a drying agent such as anhydrous magnesium sulfate or anhydrous sodium sulfate. The combined organic layers are thereafter fractionally distilled to remove the low boiling constituents and obtain the product as a residue. The residue thus obtained is then purified by such procedures as washing and/or crystallization from an organic solvent.

When it is desired to prepare the hydrogen chloride salts corresponding to Formula II, the ester-hydrazide compound is dissolved in an organic solvent, treated with an ethereal solution of hydrogen chloride to form the salt and the reaction mixture thus formed diluted with ether to facilitate the precipitation of the salt product. The salt is thereafter separated by such conventional procedures as filtration, decantation or centrifugation.

The 2-(β-hydroxyethyl) acid hydrazide compounds of the present invention corresponding to the formula

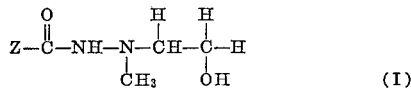

(I)

are prepared by hydrolyzing the ester linkage in the ester-hydrazides of Formula II. The hydrolysis is carried out by reacting the desired ester-hydrazide compound with an aqueous alkali metal hydroxide. In a convenient procedure, the reaction is carried out in the presence of a polar organic solvent as reaction medium. The reaction proceeds readily at temperatures of from 25° to 75° C. Good results are obtained in aqueous ethanolic solution containing about 0.05 N to about 0.2 N concentration of the alkali metal hydroxide.

In carrying out the production of the hydroxyethyl acid hydrazides corresponding to Formula I, the hydroxyethyl ester-hydrazide compound is dispersed in a polar organic solvent. Representative polar organic solvents are ethanol and methanol. Thereafter, an alkali metal hydroxide solution of controlled concentration (up to 1.0 N) is added to the mixture and the resulting reaction mixture maintained at a temperature within the reaction temperature range for a short period of time. The reaction mixture is then fractionally distilled under reduced pressure to remove the low boiling reaction medium. Thereafter, the aqueous alkaline reaction mixture is saturated with sodium sulfate and the resulting mixture extracted with an organic solvent such as chloroform, methylene chloride or ethylene dichloride. The extraction solvent is then dried and fractionally distilled under reduced pressure to obtain the desired product as a solid residue. This residue can then be further purified by such conventional procedures as washing and recrystallization from organic solvents such as isopropyl ether, benzene and 2-butanone.

The following examples illustrate the invention but are not to be construed as limiting the same.

EXAMPLE 1

N-amino-β-methyl-aminoethanol (18 grams; 0.2 mole), pyridine (32 grams; 0.4 mole) and toluene (150 cc.) were mixed together and stirred. To this stirred mixture, cyclohexane-carbonyl chloride (60 grams; 0.4 mole) was added slowly dropwise. Following the addition of the cyclohexane-carbonyl chloride, stirring was continued and the reaction was heated at the boiling temperature and under reflux for about 15 hours. Thereafter, the reaction mixture was made basic by the addition of saturated aqueous sodium carbonate. Following the addition of the aqueous alkaline solution, the organic phase was separated from the aqueous alkaline phase and the aqueous alkaline phase extracted with chloroform. The chloroform employed in the extraction procedure was then combined with the organic phase, dried over anhydrous sodium sulfate and evaporated to dryness in vacuo to obtain a gummy residue. This gummy residue was crystallized by rubbing under ether. The crystallized cyclohexane carboxylic acid 2-(β-cyclohexanecarbonyloxyethyl)-2-methyl-hydrazide product was recrystallized from hexane and found to melt at 74°–76° C. The product was found by analysis to have carbon, hydrogen and nitrogen contents of 65.75, 9.88 and 9.07 percent, respectively, as compared with the theoretical contents of 65.77, 9.74 and 9.03 percent, respectively, calculated for said hydrazide.

In substantially the same procedure, the following ester-hydrazide compounds of the present invention are produced.

Benzoic acid 2 - (β-benzoylethyl)-2-methyl-hydrazide (melting point 112°–113° C.) was prepared by mixing together N-amino-β-methyl-aminoethanol and benzoyl chloride in the presence of pyridine. (C, H and N: calculated, 68.44, 6.08 and 9.39 percent; found by analysis, 68.03, 5.96 and 9.39 percent.)

p-Cholorobenzoic acid 2-[β-p-chlorobenzoyloxy)-ethyl] 2-methylhydrazide (melting point 121°–122° C.) was prepared by mixing together N-amino-β-methyl-aminoethanol and p-chlorobenzoyl chloride in the presence of pyridine. C, H and N: calculated, 55.60, 4.39 and 7.63 percent; found by analysis, 55.98, 4.51 and 7.37 percent.)

Cinnamic acid 2-(β-cinnamoyloxyethyl)-2-methyl-hydrazide (molecular weight 350.4) is prepared by mixing together N-amino-β-methyl-aminoethanol and cinnamoyl chloride in the presence of pyridine.

EXAMPLE 2

N-amino-β-methyl-aminoethanol (90 grams; 1.0 mole), triethylamine (219 grams; 2.16 mole) and methylene chloride (800 cc.) were mixed together and stirred. To this stirred mixture, 2,4-dichlorobenzoyl chloride (460 grams; 2.2 moles) was added slowly dropwise. Following the addition of the 2,4-dichlorobenzoyl chloride, stirring was continued and the reaction mixture was heated at the boiling temperature and under reflux for about 18 hours. Thereafter, the reaction mixture was made basic by washing with water and aqueous sodium carbonate and the washings discarded. The mixture was then dried over anhydrous magnesium sulfate and evaporated to dryness in vacuo to obtain a tan oil which solidified on heating in vacuo. The solid was dissolved in a minimum of hot ethyl acetate, cooled and ligroin was added at about 30°–60° C., whereupon a precipitate formed. The 2,4-dichlorobenzoic acid 2-(β-2,4-dichlorobenzoyloxyethyl)-2-methyl-hydrazide precipitate was recrystallized from ethyl acetate and ligroin and found to melt at 89°–90° C. The hydrazide product was found by elemental analysis to have carbon, hydrogen and chlorine contents of 47.56, 3.40 and 32.46 percent, respectively, as compared with theoretical contents of 46.81, 3.24 and 32.52 percent, respectively, calculated for said product.

In substantially the same procedure, the following ester-hydrazide compounds of the present invention were produced.

3,4,5 - trimethoxybenzoic acid 2-[β-(3,4,5-trimethoxy-benzoyloxy)ethyl]-2-methylhydrazine, melting at 140.5°–141.5° C., was prepared by mixing together N-amino-β-methyl-aminoethanol and 3,4,5-trimethoxybenzoyl chloride and the product recrystallized from isopropanol. (C, H and N: calculated, 57.73, 6.32 and 5.85 percent; found by analysis, 57.87, 6.42 and 5.30 percent.)

p-Anisic acid 2 - [β - (p-anisoyloxy)ethyl]-2-methylhydrazide, melting at 124°–125° C., was prepared by mixing together N-amino-β-methyl-aminoethanol and p-anisoyl chloride and the product recrystallized from ispranol. (C, H and N: calculated, 63.67, 6.19 and 7.82 percent; found by analysis, 63.63, 6.32 and 7.40 percent.)

Dihydrocinnamic acid 2-(β-dihydrocinnamoyloxy-ethyl)-2-methylhydrazide, melting at 64°–65° C., was prepared by mixing together N-amino-β-methyl-aminoethanol and dihydrocinnamoyl chloride and the product recrystallized from isopropyl ether. (C, H and N: calculated, 71.16, 7.39 and 7.90 percent; found by analysis, 71.26, 7.44 and 8.68 percent.)

3,4-dichlorobenzoic acid 2-[β-(3,4-dichlorobenzoyloxy)ethyl]-2-methylhydrazide, melting at 134.5°–136.5° C., was prepared by mixing together N - amino-β-methyl-aminoethanol and 3,4-dichlorobenzoyl chloride and the product recrystallized from ethyl acetate. (C, H and Cl: calculated, 46.82, 3.23 and 32.52 percent; found by analysis, 46.81, 3.54 and 32.27 percent.)

m - Bromobenzoic acid 2-[β-(m-bromobenzoyloxy)ethyl]-2-methylhydrazide, melting at 139°–141° C., was prepared by mixing together N-amino-β-methyl-aminoethanol and m-bromobenzoyl chloride and the product recrystallized from isopropanol. (C, H and Br: calculated, 45.36, 3.58 and 34.18 percent; found by analysis, 45.58; 3.09 and 39.60 percent.)

EXAMPLE 3

A solution of cinnamoyl chloride (68 grams; 0.41 mole) in 100 cc. of toluene was added dropwise to a stirred mixture of N-amino-β-methyl-aminoethanol (18 grams; 0.2 mole), pyridine (32 grams; 0.41 mole) and 100 cc. of toluene. The mixture thus prepared was stirred and heated at the boiling temperature and under reflux for 22 hours. Following the heating period, the reaction mixture was cooled and made basic to litmus by the addition of a cool solution of sodium carbonate (30 grams in 250 cc. of water). The organic layer was removed and the aqueous alkaline layer extracted with chloroform. The chloroform employed in the extraction was combined with the organic layer and the resulting mixture dried with anhydrous sodium sulfate and evaporated to dryness in vacuo. The residue thus obtained was dissolved in hot ethanol (145 cc.). The hot ethanol solution was then diluted with 50 milliliters of hot water, allowed to cool to room temperature, place in the refrigerator and allowed to remain there for about 15 hours. During the refrigeration, a crystalline solid material precipitated in the reaction mixture. This crystalline solid material is separated by filtration and the filtrate reserved. The filtered solid is then recrystallized from methanol and identified as 1-methyl-1-(β-cinnamoyloxyethyl)-2,2-bis(cinnamoyl)hydrazide melting at 104°–105° C.

EXAMPLE 4

The reserved filtrate from Example 3 was concentrated to dryness in vacuo. The oily residue which remained was dissolved in methanol, treated with ethereal hydrogen chloride at room temperature, diluted with ether until turbid and allowed to stand at room temperature overnight. The reaction mixture was then filtered to remove the precipitated cinnamic acid 2-(β-cinnamoyloxyethyl)-2-methylhydrazide hydrochloride product and the latter recrystallized from methanol and found to melt at 180°–181° C. The product was found by analysis to have carbon, hydrogen and nitrogen contents of 65.44, 6.05 and 7.06 percent, respectively, as compared with the theoretical contents of 65.19, 5.99 and 7.24 percent, respectively, calculated for said hydrochloride.

Other hydrogen chloride salts of the ester-hydrazide compounds are prepared in substantially the same manner.

p-Toluic acid 2-[β-(p-toluyloxy)ethyl]-2-methylhydrazide hydrochloride, melting at 215°–217° C., was prepared by mixing p-toluic acid 2-[β-(p-toluyloxy)ethyl]-2-methylhydrazide with ethereal hydrogen chloride and recrystallizing the product from ethanol. (C, H and N: calculated, 62.89, 6.39 and 7.72 percent; found by analysis, 63.03, 6.68 and 7.40 percent.)

2-furoic acid 2-[β-(2-furylcarbonyloxy)ethyl]-2-methylhydrazide hydrochloride, melting at 189°–191° C. with decomposition, was prepared by mixing 2-furoic acid 2-[β-(2-furylcarbonyloxy)ethyl]-2-methylhydrazide with ethereal hydrogen chloride and recrystallizing the product from methanol. (C, H and N: calculated, 49.61, 4.80 and 8.90 percent; found by analysis, 49.73, 5.19 and 8.94 percent.)

o-Chlorobenzoic acid 2-[β-(o-chlorobenzoyloxy)ethyl]-2-methylhydrazide hydrochloride, melting at 134°–138° C., was prepared by mixing o-chlorobenzoic acid 2-[β-(o-chlorobenzoyloxy)ethyl]-2-methylhydrazide with ethereal hydrogen chloride and recrystallizing the product from methanol and ethyl ether. (C, H and N: calculated, 50.58, 4.24 and 6.94 percent; found by analysis, 53.97, 4.44 and 7.31 percent.)

p-Chlorobenzoic acid 2-[β-(p-chlorobenzoyloxy)ethyl]-2-methylhydrazide hydrochloride (molecular weight 403.7) is prepared by mixing p-chlorobenzoic acid 2-[β-(p-chlorobenzoyloxy)ethyl]-2-methylhydrazide with ethereal hydrogen chloride.

Benzoic acid 2-(β-benzoyloxyethyl)-2-methylhydrazide hydrochloride (molecular weight 334.8) is prepared by mixing benzoic acid 2-(β-benzoyloxyethyl)-2-methylhydrazide with ethereal hydrogen chloride.

Cyclohexanecarboxylic acid 2-(β-cyclohexanecarbonyloxyethyl)-2-methylhydrazide hydrochloride (molecular weight 346.9) is prepared by mixing cyclohexanecarboxylic acid 2-(β-cyclohexanecarbonyloxyethyl)-2-methylhydrazide with ethereal hydrogen chloride.

EXAMPLE 5

Cyclohexanecarboxylic acid 2-[β-(cyclohexanecarbonyloxy)ethyl]2-methylhydrazide (25.3 grams), ethanol (320 cc.) and aqueous 0.2 N sodium hydroxide (500 cc.) were mixed together and heated at 70° C. for 3 hours. Following the heating period, the reaction mixture was distilled under reduced pressure to remove the ethanol. Thereafter the alkaline mixture was saturated with sodium sulfate and the resulting mixture extracted with chloroform. The chloroform extract was dried with anhydrous sodium sulfate and evaporated to dryness to obtain a solid residue. This solid cyclohexanecarboxylic acid 2-(β-hydroxyethyl)-2-methylhydrazide product was recrystallized from isopropyl ether and found to melt at 95°–96° C. The product was found by analysis to have carbon and hydrogen contents of 60.40 and 10.03 percent, respectively, as compared with the theoretical contents of 59.97 and 10.07 percent, respectively, calculated for said hydrazide.

The following hydroxyethyl hydrazides of the present invention were prepared in substantially the same manner.

Benzoic acid 2-(β-hydroxyethyl)-2-methylhydrazide, melting at 120°–120.5° C., was prepared by mixing benzoic acid 2-(β-benzoyloxyethyl)-2-methylhydrazide and 0.1 N aqueous sodium hydroxide. (C, H and N: calculated, 61.83, 7.26 and 14.43 percent; found by analysis, 61.62, 7.16 and 15.17 percent.)

p-Chlorobenzoic acid 2-(β-hydroxyethyl)-2-methylhydrazide, melting at 128°–129° C., was prepared by mixing together p-chlorobenzoic acid 2-[β-(p-chlorobenzoyloxy)ethyl]-2-methylhydrazide and 0.1 N aqueous sodium hydroxide. (C, H and N: calculated, 52.52, 5.73 and 12.25 percent; found by analysis, 51.96, 5.59 and 12.20 percent.)

EXAMPLE 6 p-Toluic acid 2-[β-(p-toluyloxy)ethyl]-2-methylhydrazide (198 grams; 0.545 mole) was dissolved in 1300 milliliters of hot ethanol and stirred. Sodium hydroxide (55 grams; 1.37 moles) dissolved in 500 milliliters of water was added dropwise, after which the mixture was heated to reflux for three hours. Following the heating period, the mixture was distilled under reduced pressure to remove the ethanol. Thereafter, the alkaline mixture was diluted with water and the resulting mixture extracted with chloroform. The chloroform extract was dried with anhydrous magnesium sulfate and concentrated. A solid residue formed on standing. This solid p-toluic acid 2-(β-hydroxyethyl)-2-methylhydrazide product was recrystallized three times from ethyl acetate and found to melt at 105°–106° C. The product was found by analysis to have carbon, hydrogen and nitrogen contents of 63.26, 7.91 and 13.25 percent, respectively, as compared with the theoretical contents of 63.44, 7.74 and 13.45 percent, respectively, calculated for the named hydrazide.

The following hydroxyethyl hydrazides of the present invention were prepared in substantially the same manner.

3,4,5-trimethxybenzoic acid 2-(β-hydroxyethyl)-2-methylhydrazide, melting at 161°–162° C., was prepared by mixing together 3,4,5-trimethoxybenzoic acid 2-[β-(3,4,5 - trimethoxybenzoyloxy)ethyl]-2-methylhydrazide and sodium hydroxide and recrystallizing the product from ethyl acetate. (C, H and N: calculated, 54.92, 7.09 and 9.85 percent; found by analysis, 54.86, 7.31 and 9.16 percent.)

2,4-dichlorobenzoic acid 2-(β-hydroxyethyl)-2-methylhydrazide, melting at 103°–105° C., was prepared by mixing together 2,4-dichlorobenzoic acid 2-[β-(2-4-dichlorobenzoyloxy)ethyl]-2-methylhydrazide and sodium hydroxide and recrystallizing the product from isopropanol and ether. (C, H and Cl: calculated, 45.65, 4.60 and 26.95 percent; found by analysis, 46.28, 4.92 and 27.17 percent.)

p-Anisic acid 2-(β-hydroxyethyl)-2-methylhydrazide, melting at 124.5°–125.5° C., was prepared by mixing together p-anisic acid 2-[β-(p-anisoyloxy)-ethyl]-2-methylhydrazide and sodium hydroxide and recrystallizing the product for ethyl actate.

Dihydrocinnamic acid 2-(β-hydroxyethyl)-2-methylhydrazide, melting at 62°–64° C., was prepared by mixing together dihydrocinnamic acid 2-(β-dihydrocinnamoyloxyethyl)-2-methylhydrazide and sodium hydroxide and recrystallizing the product from ethyl acetate.

2-furoic acid 2-(β-hydroxyethyl)-2-methylhydrazide, melting at 87.5°–89° C., was prepared by mixing together 2-furoic acid 2-[β-(2-furylcarbonyloxy)ethyl]-2-methylhydrazide and sorium hydroxide and recrystallizing the product from ethyl acetate and ether.

3,4-dichlorobenzoic acid 2-(β-hydroxyethyl)-2-methylhydrazide, melting at 140°–142° C., was prepared by mixing together 3,4-dichlorobenzoic acid 2-[β-(3,4-dichlorobenzoyloxy)ethyl]-2-methylhydrazide and aqueous sodium hydroxide and recrystallizing the product from ethyl actate.

o-Chlorobenzoic acid 2 - (β - hydroxyethyl-2-methylhydrazide, melting at 87°–90° C., was prepared by mixing together m-bromobenzoic acid 2-[β-(m-bromobenzoyloxy)ethyl]-2-methylhydrazide and aqueous sodium hydroxide and recrystallizing the product from ethyl acetate.

m-Bromobenzoic acid 2-(β-hydroxyethyl)-2-methylhydrazide, melting at 84°–85.5° C., was prepared by mixing together m-bromobenzoic acid 2-[β-(m-bromobenzyloxy)ethyl]-2-methylhydrazide and aqueous sodium hydroxide and recrystallizing the product from ethyl acetate.

Representative hydrazides of the present invention were administered to albino mice at a dosage rate of 100 milligrams per kilogram by intraperitoneal injection. Injections at such dosages were carried out successively at intervals of 72, 48, 24 and 2 hours for a total of four doses prior to challenging with 3,4-dihydroxyphenyl-L-alanine (DOPA). Five mice were so treated with each compound tested. During the pretreatment period, the animals were examined for gross signs of alteration such as depression, weight loss or the like. No changes from normal were observed. Two hours after the last dosage of the hydrazide compound, DOPA was administered to each mouse at a dosage rate of 200 milligrams per kilogram of body weight. The mice were then observed for symptoms of hyper-irritability. The reuslts are summarized in the following table.

| Compound Administered | Response to DOPA Administration |
|---|---|
| Cyclohexanecarboxylic acid 2-(β-hydroxyethyl)-2-methylhydrazide | +++ |
| Cyclohexanecarboxylic acid 2-[β-(cyclohexanecarbonyloxy)ethyl]-2-methylhydrazide | +++ |
| p-Chlorobenzoic acid 2-[β-(p-chlorobenzoyloxy)ethyl]-2-methylhydrazide | ++++ |
| p-Chlorobenzoic acid 2-(β-hydroxyethyl)-2-methylhydrazide | ++++ |
| Benzoic acid 2-(β-hydroxyethyl)-2-methylhydrazide | ++++ |
| 1-Methyl-1-(β-cinnamoyloxyethyl)-2,2-bis(cinnamoyl)hydrazine | +++ |
| Benzoic acid 2-(β-benzoyloxyethyl)-2-methylhydrazide | ++++ |
| Cinnamic acid 2-(β-cinnamoyloxyethyl)-2-methylhydrazide hydrochloride | ++ |

+=Brief increase in irritability; ++=two hour increase in irritability; +++=marked increase in irritability accompanied by some signs of salivation and/or Straub tail; ++++=marked increase in irritability accompanied by signs of spontaneous activity increase.

When DOPA is administered to controls which have not received any hydrazide compound of the present invention (or any other known monoaminoxidase (inhibitor), little or no effect is observed.

In other operations, representative hydrazides of the present invention were administered to albino mice at a dosage rate of 100 milligrams per kilogram by intraperitoneal injection. Injection at such dosages was carried out successively at intervals of 72, 48, 24 and 2 hours for a total of four doses prior to challenging with reserpine. Five mice were so treated with each compound tested. During this pretreatment period, the animals were examined for gross signs of alteration, depression, weight loss or the like. No changes from normal were observed. Two hours after the last dose of the hydrazide compound, reserpine was administered to each mouse at a dosage rate of 100 milligrams per kilogram.

The administration of 5 milligrams per kilogram of reserpine intraperitoneally to mice results in a progression of signs starting with drooping of the eyelids (ptosis) and pilo-erection and culminating in a generalized depression with decreased spontaneous motor activity and decreased responsiveness to auditory or tactile stimuli.

Following the administration of the reserpine, the test animals are observed for the above signs of depression. The results are summarized in the following table.

| Compound Administered | Response to Reserpine Administration |
|---|---|
| Benzoic acid 2-(β-benzoyloxyethyl)-2-methylhydrazide | + |
| Benzoic acid 2-(β-hydroxyethyl)-2-methylhydrazide | +++ |
| p-Chlorobenzoic acid 2-[β-(p-chlorobenzoyloxy)ethyl]-2-methylhydrazide | + |
| p-Chlorobenzoic acid 2-(β-hydroethyl)-2-methylhydrazide | ++ |
| Cyclohexanecarboxylic acid 2-[β-(cyclohexanecarbonyloxy)-ethyl]-2-methylhydrazide | + |

+=Brief protection from reserpine-induced ptosis; ++=moderate protection from ptosis and depression; +++=two hour protection from ptosis and depression; ++++=reversal of reserpine-induced depression.

If mice are pretreated with a known anti-depressant of the monoaminoxidase inhibitor type, the characteristic depression caused by reserpine is delayed and may even be reversed with the mice passing through a period of increased spontaneous motor activity and hyperirritability to stimuli.

The responses such as were observed as a result of the foregoing test have been found to be characteristic of monoaminoxidase inhibitor compound which have demonstrated anti-depressant pharmacological activity in vivo. (Annals of the New York Academy of Sciences, vol. 80, art. 3, pp. 551–1,046; 1959).

The hydrazides of the present invention are also useful as pesticides. In representative operations, 3,4-dichlorobenzoic acid 2-(β-hydroxyethyl)-2-methylhydrazide gave complete control of each of the water plants milfoil,

*Cabomba caroliniana, Lysimastrum nummularia* and *Salvinia rotundifolia* when added to the respective plant's aqueous environment as the sole toxicant and in an amount sufficient to provide a toxicant concentration of 20 parts per million by weight. In other operations, good controls and kills of the two-spotted spider mite were obtained when liquid compositions containing 0.1 percent by weight of p-chlorobenzoic acid 2-(β-hydroxyethyl)-2-methylhydrazide as the sole toxicant therein were applied to mite-infested plants. In other operations, liquid compositions containing o-chlorobenzoic acid 2-(β-hydroxethyl)-2-methylhydrazide as the sole toxicant and in an amount sufficient to provide a toxicant concentration of 0.75 (weight/volume) percent gave substantially complete control of nymphs of the Lone Star tick, *Amblyomma americanum*, when used as a dip. In other operations, aqueous compositions containing m-bromobenzoic acid 2-(β-hydroxyethyl)-2-methylhydrazide as the sole toxicant and in an amount sufficient to provide a toxicant concentration of 0.8 percent by weight gave good control of bean mildew when applied as a spray. In other operations, liquid compositions containing 200 parts per million by weight of 2-furoic acid 2-(β-hydroxethyl)-2-methylhydrazide as the sole toxicant gave good kills of root-knot nematodes when employed as a drench for nematode-infested soil.

The novel hydrazides can be employed as the toxicant in anthelmintic compositions. For such uses, the toxicant compound can be administered in the form of capsules, tablets or boluses or dispersed in animal feed compositions. Such compositions are generally given as a single dose or at frequent intervals over a short period. In representative operations, dogs known to be infested with whipworms were administered a single oral dose by a capsule containing benzoic acid 2-[β-(benzoyloxy)ethyl]-2-methylhydrazide as the sole toxicant and at a dosage of 35 milligrams per kilogram of body weight. Substantially complete kills of the whipworms were found by necropsy of the test animals five days after administration of the test compound. In other operations, mice infected with tapeworms were fed daily for 7 days on a diet containing 0.06 percent of the compound p-chlorobenzoic acid 2-[β-(p-chlorobenzoyloxy)ethyl]-2-methylhydrazide. Necropsy findings at the end of the test period showed complete control of the tapeworms.

The N-amino-β-methyl aminoethanol employed as a starting material in the present invention is prepared by reducing N-nitroso-β-methyl-aminoethanol with lithium aluminum hydride. The reaction is carried out in the presence of a liquid reaction medium such as tetrahydrofuran. The reaction mixture is conveniently heated at the boiling temperature and under reflux for a period of time. Following the heating period, the reaction mixture is diluted with water in order to precipitate a solid material. The reaction mixture is then filtered to remove the precipitated solid material which is thereafter washed with isopropyl alcohol. The combined isopropyl alcohol washings and the filtrate solution was then fractionally distilled under reduced pressure to yield the N-amino-β-methyl-aminoethanol product as a liquid fraction boiling at 189°–190° C. at 760 millimeters of mercury.

I claim:

1. A novel hydrazide compound selected from the group of substituted hydroxyethyl hydrazides corresponding to one of the formulae

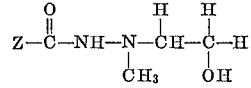

and

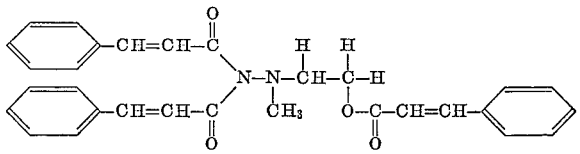

wherein Z is selected from the group consisting of cyclohexyl, phenyl, benzyl, styryl and a substituted phenyl group having from 1 to 2 substituents selected from the group consisting of methyl, methoxy, chlorine and bromine.

2. The substituted hydroxyethyl hydrazide claimed in claim 1 wherein the compound is benzoic acid 2-(β-hydroxyethyl)-2-methylhydrazide.

3. The substituted hydroxyethyl hydrazide claimed in claim 1 wherein the compound is cyclohexanecarboxylic acid 2-(β-hydroxyethyl)-2-methylhydrazide.

4. The substituted hydroxyethyl hydrazide claimed in claim 1 wherein the compound is 1-methyl-1-(β-cinnamoyloxyethyl)-2,2-bis(cinnamoyl)hydrazine.

5. The substituted hydroxyethyl hydrazide claimed in claim 1 wherein the compound is p-chlorobenzoic acid 2-(β-hydroxyethyl)-2-methylhydrazide.

6. The substituted hydroxyethyl hydrazide claimed in claim 1 wherein the compound is 3,4-dichlorobenzoic acid 2-(β-hydroxyethyl)-2-methylhydrazide.

7. The substituted hydroxyethyl hydrazide claimed in claim 1 wherein the compound is o-chlorobenzoic acid 2-(β-hydroxyethyl)-2-methylhydrazide.

8. The substituted hydroxyethyl hydrazide claimed in claim 1 wherein the compound is m-bromobenzoic acid 2-(β-hdroxyethyl)-2-methylhydrazide.

References Cited

Treparier et al.: J. Org. Chem, vol. 29, pp. 673–677 (1964).

Ishadate et al.: Chem. Pharm. Bull., vol. 8, pp. 543–550 (1960).

JAMES A. PATTEN, Primary Examiner

E. GLEIMAN, Assistant Examiner

U.S. Cl. X.R.

71—66, 88, 106, 107; 260—347.3, 347.5, 473, 477, 544, 557, 558, 559, 584, 999